(12) United States Patent
Griffiths et al.

(10) Patent No.: US 9,596,733 B2
(45) Date of Patent: Mar. 14, 2017

(54) SWITCH-ACTUATED ARRANGEMENTS

(75) Inventors: Bryn Griffiths, Hong Kong (HK); Jon Duncan, Middlesex (GB)

(73) Assignee: BENMORE VENTURES LIMITED, Tortola (VG)

( * ) Notice: Subject to any disclaimer, the term of this patent is extended or adjusted under 35 U.S.C. 154(b) by 89 days.

(21) Appl. No.: 13/514,441

(22) PCT Filed: Dec. 13, 2010

(86) PCT No.: PCT/GB2010/002265
§ 371 (c)(1),
(2), (4) Date: Jul. 3, 2012

(87) PCT Pub. No.: WO2011/070337
PCT Pub. Date: Jun. 16, 2011

(65) Prior Publication Data
US 2012/0268017 A1 Oct. 25, 2012

(30) Foreign Application Priority Data

Jun. 3, 2009 (GB) .................................. 0921748.0
Jun. 3, 2010 (GB) .................................. 1009333.4

(51) Int. Cl.
*F21V 21/088* (2006.01)
*F21V 21/14* (2006.01)
*H05B 37/02* (2006.01)
*H05B 33/08* (2006.01)

(52) U.S. Cl.
CPC ..... *H05B 37/0218* (2013.01); *H05B 33/0842* (2013.01); *B65D 2203/12* (2013.01); *Y02B 20/46* (2013.01)

(58) Field of Classification Search
CPC ................................... H05B 37/02; H02J 7/00
USPC .... 315/362, 291, 200 R, 209 R, 82; 320/166
See application file for complete search history.

(56) References Cited

U.S. PATENT DOCUMENTS

| 4,296,459 | A | | 10/1981 | DeLuca | |
|---|---|---|---|---|---|
| 4,523,258 | A | * | 6/1985 | Morse et al. | ................. 362/108 |
| 5,458,186 | A | * | 10/1995 | Lee et al. | ...................... 165/263 |
| 6,175,196 | B1 | * | 1/2001 | Ragner et al. | ............ 315/200 A |
| 6,254,247 | B1 | * | 7/2001 | Carson | ......................... 362/101 |
| 6,419,384 | B1 | * | 7/2002 | Lewis et al. | .................. 362/562 |

(Continued)

FOREIGN PATENT DOCUMENTS

| CA | 2 549 686 A1 | 7/2007 |
|---|---|---|
| CA | 2549686 A1 | 12/2007 |

(Continued)

OTHER PUBLICATIONS

International Search Report dated Mar. 23, 2011.

*Primary Examiner* — Douglas W Owens
*Assistant Examiner* — Wei Chan
(74) *Attorney, Agent, or Firm* — Thomas | Horstemeyer, LLP

(57) ABSTRACT

An article incorporating a light or sound source (14) has two or more switches (18, 24, 26) which must be closed for the source (14) to be actuated, the switches being arranged to be successively closed at different stages of the packing, unpacking and using procedures. A first switch (26) can be a pull tab arrangement, closed on packing or unpacking the article. A second switch (18) can be a light-sensitive switch. A third switch (24) can be a user-operated switch or a tilt switch etc.

16 Claims, 2 Drawing Sheets

(56) References Cited

U.S. PATENT DOCUMENTS

| | | | |
|---|---|---|---|
| 6,828,739 B2* | 12/2004 | Bruwer et al. | 315/291 |
| 7,119,459 B2* | 10/2006 | Bruwer et al. | 307/140 |
| 7,202,613 B2* | 4/2007 | Morgan et al. | 315/312 |
| 7,498,749 B2* | 3/2009 | Bruwer | 315/200 A |
| 7,583,031 B1* | 9/2009 | Sansone | 315/132 |
| 7,659,671 B2* | 2/2010 | Martin | 315/209 R |
| 7,772,986 B2* | 8/2010 | Olson et al. | 340/692 |
| 8,134,303 B2* | 3/2012 | Lys | 315/291 |
| 8,493,229 B2* | 7/2013 | Olson et al. | 340/692 |
| 8,508,080 B2* | 8/2013 | Avis | 307/141 |
| 8,636,949 B2* | 1/2014 | Bufano et al. | 422/22 |
| 2001/0028561 A1* | 10/2001 | Pitts | 362/84 |
| 2003/0081408 A1* | 5/2003 | Tai | A47G 19/2227 362/101 |
| 2004/0004829 A1* | 1/2004 | Policappelli | 362/101 |
| 2005/0082989 A1* | 4/2005 | Jones et al. | 315/194 |
| 2005/0083626 A1* | 4/2005 | Bruwer | 361/93.1 |
| 2005/0168158 A1* | 8/2005 | Inochkin et al. | 315/219 |
| 2005/0178131 A1* | 8/2005 | Ryu et al. | 62/131 |
| 2006/0028811 A1* | 2/2006 | Ross et al. | 362/157 |
| 2006/0139928 A1* | 6/2006 | Griffiths | B65D 51/248 362/276 |
| 2006/0201181 A1* | 9/2006 | Bauer et al. | 62/264 |
| 2006/0249662 A1* | 11/2006 | Turner | 250/221 |
| 2007/0008712 A1* | 1/2007 | Schnitzer | B63C 9/20 362/96 |
| 2007/0133199 A1* | 6/2007 | Lebens et al. | 362/157 |
| 2007/0188338 A1* | 8/2007 | Morrison | G01C 9/06 340/689 |
| 2007/0201220 A1* | 8/2007 | Ulicny | B65D 23/00 362/101 |
| 2007/0217187 A1* | 9/2007 | Blakely et al. | 362/154 |
| 2007/0268682 A1* | 11/2007 | Kim et al. | 362/92 |
| 2008/0111685 A1* | 5/2008 | Olson | B65D 55/028 340/545.6 |
| 2008/0164826 A1* | 7/2008 | Lys | 315/250 |
| 2008/0204268 A1* | 8/2008 | Dowling et al. | 340/815.45 |
| 2008/0211428 A1* | 9/2008 | Bayat et al. | 315/299 |
| 2008/0246416 A1* | 10/2008 | Jones et al. | 315/294 |
| 2009/0059603 A1* | 3/2009 | Recker et al. | 362/362 |
| 2009/0097227 A1* | 4/2009 | Kim et al. | 362/92 |
| 2009/0097236 A1* | 4/2009 | Miller et al. | 362/119 |
| 2009/0290331 A1* | 11/2009 | Jacobs | A45C 15/06 362/155 |
| 2009/0295300 A1* | 12/2009 | King | 315/209 R |
| 2010/0127634 A1* | 5/2010 | Dowling et al. | 315/291 |
| 2010/0176750 A1* | 7/2010 | West | 315/362 |
| 2010/0212344 A1* | 8/2010 | Mattucci | 62/264 |
| 2010/0242520 A1* | 9/2010 | Weir | 62/264 |
| 2010/0259183 A1* | 10/2010 | Leshniak | 315/287 |
| 2010/0280511 A1* | 11/2010 | Rachlin et al. | 606/34 |
| 2011/0143000 A1* | 6/2011 | Fiset | 426/248 |
| 2011/0227500 A1* | 9/2011 | West | 315/287 |

FOREIGN PATENT DOCUMENTS

| | | |
|---|---|---|
| DE | 102 39 008 A1 | 3/2004 |
| DE | 10239008 A1 | 3/2004 |
| EP | 1 707 872 A2 | 10/2006 |
| EP | 1707872 A2 | 10/2006 |
| FR | 2 775 758 A1 | 9/1999 |
| FR | 2775758 A1 | 9/1999 |
| WO | 2004/084163 A1 | 9/2004 |
| WO | 2004084163 A1 | 9/2004 |
| WO | 2004/110892 A1 | 12/2004 |
| WO | 2004110892 A1 | 12/2004 |
| WO | 2010/055312 A1 | 5/2010 |
| WO | 2011/007113 A1 | 1/2011 |
| WO | 2011/070336 A1 | 6/2011 |
| WO | 2011/070337 A1 | 6/2011 |

* cited by examiner

SWITCH-ACTUATED ARRANGEMENTS

CROSS-REFERENCE TO RELATED APPLICATION

This application is a co-pending application which claims priority to PCT Application No. PCT/GB2010/002265, filed Dec. 13, 2010, entitled "Switch-Actuated Arrangements" herein incorporated by reference in its entirety. This application also claims priority to, and the benefit of, Great Britain Patent Application No. 1009333.4, filing date Jun. 3, 2010, and Great Britain Application No. 0921748.0, filing date Dec. 11, 2009, both of which are herein incorporated by reference in their entireties.

The present invention relates to switch-actuated arrangements and in particular to switch-actuated illumination devices, e.g. for illuminating containers to which the devices are attached, and more especially for illuminating the contents of such containers Various container illumination devices are known that utilise different actuation methods to suit different applications. Several such devices are disclosed in WO2004/110892 and also in co-pending applications PCT/GB2009/002097 and PCT/GB2009/002676.

Some of the previous devices require a single stage actuation such as the removal of an insulating pull-tab from directly under a battery, or the pressing of a switch to trigger an illumination effect or other output. Other devices require a two stage actuation process, the initial stage being the removal of an insulating pull-tab from directly under a battery to make an electrical contact therewith, so that a secondary sensor can then become the main actuating agent e.g. a motion or tilt sensor, a vibration sensor, a temperature sensor, an audio sensor or any other sensor type.

In all of the above-mentioned instances, however, manual intervention at the primary actuation stage is necessary i.e. someone has to remove the pull-tab or press a switch to complete the circuit so that either the device is actuated immediately or a secondary actuation sensor is enabled. Ideally, to maximise the longevity of the batteries powering each device, the pull-tab should be removed just before the bottles/containers, to which the devices are attached, are put to their intended end use e.g. behind a bar, on-shelf in a store or in the home. For the pull-tab to be removed, the person removing the pull-tab needs to be aware that there is a pull-tab in the first place and that its removal will enable a sensor to be able to actuate an output, e.g. the illumination of the bottle contents. The pull-tab is not always obvious for the untrained eye to see because ordinarily the whole device is hidden in the base recess of the bottle/container (or elsewhere that may be out of sight).

One solution, therefore, could be for specially trained field operatives to be made responsible for removing each and every pull-tab. However, for drinks containers that are typically distributed and sold through mass market on-and-off premise channels globally, often in the millions of units, having specially trained staff available to remove the pull-tab in every instance is not practical. It would require vast manpower and would be prohibitively expensive.

By way of an example, in an on-premise environment, busy bar staff would be required to remove the pull-tab and/or physically apply the device to the base of a bottle. This could well be achieved by providing the devices in clearly labelled packets so that the bar staff were made aware of how to apply and actuate the units. Alternatively, it could be achieved by the drinks companies' field representatives educating bar staff during personal visits to bar premises about how to use the devices. This would run the risk of bar staff simply not receiving or understanding the necessary information, or bar staff deciding that they do not wish to participate in the promotion through reasons of apathy or workload.

These problems are amplified still further in off-premise locations, for example in point-of-sale situations in supermarkets and also in the home.

In an off-premise environment, in a supermarket for example, specially trained field teams could be employed directly by the drinks companies, visiting supermarkets and physically stacking the shelves with product, in order to pull the tabs. But to put that into context in terms of manpower, over the busy Christmas period for example, the shelves carrying spirits bottles in a single supermarket would need to be restocked several times just in one day. That would effectively mean that each supermarket would require a special field team employed by the drinks companies to enter each supermarket in a region several times a day just to stack the shelves. Alternatively that task could fall to staff employed directly by the supermarkets. It is highly unlikely however that the supermarket chains would allow their busy employees to be trained to do this or to take the time to carry out this additional function on behalf of the drinks companies.

Of course, for off-premise sales made directly to the general public through for example a supermarket, one solution might be to attach the devices to the bottles/containers at the bottling/packing facility but not to pull the tab. The supermarkets employees could then stack the shelves as normal and it could be left up to the general public themselves to actuate the devices. Again, this is far from ideal as it would require an element of educating the public as to the methods of actuation, which could take the form of costly promotional and marketing campaigns. But again this runs the risk of purchasers not understanding the necessary information or declining to participate through reasons of apathy or lack of time. Alternatively the devices could be provided to the general public unattached to the bottle/container in packets with instructions but that is no guarantee that the instructions will be read, understood or that the customers would attach the device themselves.

Another issue with asking the general public to attach and/or actuate the devices themselves is that it takes away an opportunity for the drinks brand of running an on-shelf promotion in-store because the unit would not be actuated until the customer had taken the product home. By way of example, a typical point-of-sale promotion could involve a device fitted with a tilt/motion switch that actuates a timed contents illumination effect when the bottle is picked up. This could be used to create a sudden attention grabbing effect encouraging other customers to try the brand. That opportunity is lost if the pull-tab on the device is not already removed.

Similarly, another typical point-of-sale application of the device utilises a vibration sensor such as a passive piezo-electric sensor. This can be used for sensing the movement of products on a supermarket shelf such that the device is actuated either when the container is moved/picked up, or if a competitor product on the same shelving unit is picked up—in both instances creating a highly eye catching effect that can influence customer behaviour. Similar vibration sensing devices can also be used for sensing the dispensing of a measure of liquid from an optics dispenser. However, the power of this on-shelf promotional opportunity is lost if the pull-tab on the device is not already removed.

Thus there is a need for no third party interaction/intervention to be necessary by the untrained user/handler of the product (e.g. bar staff, shelf stackers, warehouse operatives or the general public). On leaving the bottling facility or any other establishment from which the container originates, one arrangement could be for the device to already be attached to the container with the pull-tab already removed, such that the device is already in its 'on' state.

However, removal of the pull-tab before the device leaves the bottling/packing facility creates a problem, as the device could be actuated well in advance of its intended use. If the device were in an 'on' state during transit or storage, there could be unwanted triggering of the device and subsequent draining of its batteries.

For example, in supermarkets, on-bottle point-of-sale devices typically use as their primary activation methods vibration or motion/tilt sensors to attract consumer attention and to influence customer behaviour in-store. These sensors are also used as promotional tools in the home. However, these actuation methods require a pull-tab primary actuation stage, to actuate the vibration or motion/tilt sensing secondary actuation stage. If the devices had their pull-tabs removed so they were actuated at the bottling or packing facility and then transported to a warehouse, bar, supermarket, or other destination, it is likely that the device could constantly trigger in transit and its batteries could have run down before the device reached the supermarket shelves. By way of example, transit would most likely be via haulage vehicles and journey times can vary from a few minutes to days or even weeks. Additionally any journey, be it by road, rail, air or ship is bumpy and noisy. The combination of these conditions for prolonged periods of time could cause motion/tilt sensors, vibration sensors, and audio sensors to continually trigger. Temperature sensors could also falsely trigger as the temperature of the environments they were subjected to during transport varied.

Thus, removing the pull-tab prior to shipping from the bottling/packing facility runs a real risk of rendering the device incapable of performing the promotional activity it was designed for through flattening of the batteries. Similarly, having arrived at its intended destination, the container could remain in storage for a period of time, before it is actually used, for example in the stock cupboard of a bar or club, or in the warehouse of a supermarket. A device fitted with a sound/music sensor could falsely trigger whilst in-storage in a bar that is playing music, just as a vibration sensing device could falsely trigger in a supermarket's warehouse each time the rack it is stored on is disturbed by other supermarket products being added or removed to the racking. Additionally, warehouse storage is often cold and this could affect temperature sensing devices.

Existing illumination devices employ bonded LED devices as light sources. It would be desirable to provide a light-emitting device which shone more brightly.

Another desirable feature would be to have a light-emitting device which could emit lights in a multiplicity of different colours, so as to provide an interesting display. However, in devices for illuminating containers, space is usually at a premium. In bottles, for example, it is often required to squeeze an illuminating device and its associated circuitry into a relatively small bottom recess.

Bonding LEDs can be a partially manual process. A machine is used, which has coordinates programmed into it, in order to add bonding wires. Resin is then applied manually to cover the mounted LED, typically in a dome shape. A problem with this application of resin is that it can spread over a relatively large surrounding area, and thus may encroach into spaces provided for other components or onto pad areas which are later required for the hand soldering of other components. This may impose design constraints so that one is prevented from using the best components for a specific design, because the components cannot fit into the available space. Lack of space also means that compromises in the positioning of the LEDs may have to be made, even at the design stage.

Spreading of the resin may also overlap the area for cell insertion, so that a cell may be undesirably lifted away from an underlying printed circuit board by even small amounts of hardened resin. This can produce malfunctioning of the device due to intermittent battery connections. Sometimes the resin encroachment into the battery areas means one cannot push the battery under the battery clip.

When a bonded LED and its resin are placed very close to a pad which requires hand soldering, it becomes possible for a worker to accidentally burn the resin, altering its light dispersion and light output and sometimes the colour of light becomes tinted by discoloured resin.)

Aspects of the invention seek to overcome or at least reduce one or more of the above problems.

According to a first aspect of the present invention, there is provided an article packed in packaging material, the article comprising at least one light or sound source, and an electrical circuit for actuating the source, the circuit including at least one battery and at least first and further switch means, both of which must be closed for the source to be actuated, the arrangement being such that, with the article in its condition with packaging, the first switch means is open, and, with the packaging removed, the first switch means is closed.

An advantage of the above article is that the risk of premature and/or any undesired actuation of the light or sound source is minimised. This is of particular advantage in battery-powered devices.

In a preferred arrangement the first switch means comprises a first switch arrangement and a second switch arrangement, the first switch arrangement being configured to make an electrical connection between a battery terminal and an adjacent circuit conductor. The first switch means or the first switch arrangement may comprise a pull-tab. Such arrangements have the advantage that they can be readily primed for action when packing or unpacking the article.

The first switch means or the second switch arrangement may comprise a light sensing device. It is easy to arrange for such a device to be exposed as part of a normal unpacking procedure.

The second switch arrangement and/or the further switch means may be constituted by a tilt switch arrangement. This provides a convenient way for the light or sound source to be actuated by a user.

One or more surface mount LED devices may be used as a light source. By permitting an increased component packing density, they allow a brighter display lighting effect to be provided.

According to a second aspect of the present invention, there is provided a method of actuating at least one light or sound source attached to an article, wherein a drive circuit for the source comprises at least first and further switch means, both of which have to be closed for the source to be activated, the method comprising closing the first switch means before packing of the article, or during packing of the article, or when unpacking the article, and closing the further switch means at a stage subsequent to closing the first switch means.

The second switch is preferably arranged to be opened automatically when unpacking the article.

According to a further aspect of the present invention, there is provided an article comprising a light or sound source and an electrical circuit for actuating the source, wherein the circuit comprises three switches, all of which must be closed for the source to be actuated, wherein the switches are of three different types.

Thus one switch may be a pull-tab switch. Another switch may be a switch which is closed in the presence of light. A further switch may be a user-operated switch, a tilt switch, a switch closed in response to an environmental factor, or a time switch.

When a light source is provided it is preferably an LED device and in particular an SMD LED.

Preferred embodiments of the present invention will now be described, by way of example only with reference to the accompanying drawings, of which;

Figure 1:
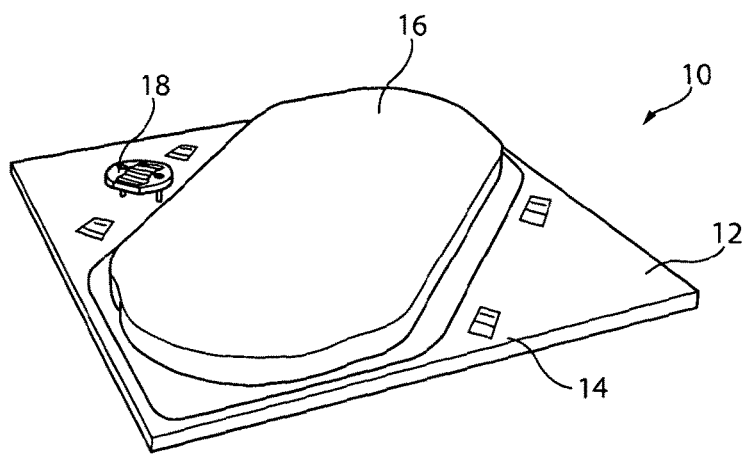
FIG. 1 is a perspective view of a switch-actuated device in accordance with an embodiment of the present invention.
Figure 2:
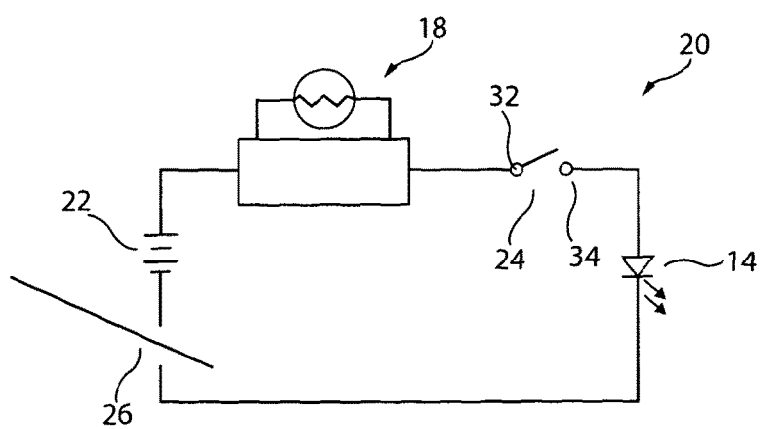
FIG. 2 is a basic circuit diagram of the device of FIG. 1.

Referring to the drawings, FIGS. 1 and 2 show a switch-actuated device 10, comprising a printed circuit board 12 with four LED devices 14. The LED devices 14 are rectangular SMD (Surface Mount Device) LEDs. The device 10 may be part of a label or other article for attaching to a container as described in the above-mentioned patent applications. Drive circuitry including a switch member 24 and one or more battery cells 22 for the LED's 14 is mounted on the board 12 inside an opaque housing 16. A light sensor 18 is also provided on board 12, and is connected to the circuitry within housing 16 to constitute a further switching member therefor.

In a modification, housing 16 is of transparent material, in which case the light sensor 18 and/or the LED's 14 can be mounted inside housing 16 which helps to keep them clean. Instead of surface mount LED's, bonded LED's may be provided. Light sources other than LED's can be employed. Housing 16 can be omitted.

FIG. 2 is a circuit diagram of a circuit 20 incorporating the device of FIG. 1. LED devices 14 (are connected to with battery 22, light sensing device 18 and a switch member 24 arranged to be operated by a user of the device. At an initial stage of operation, an insulating pull-tab 26 is located between battery 22 and one of its contacts, so that discharge of the battery is not possible until the tab has been removed. This constitutes a first switch arrangement.

Light sensor 18 is set so that only when it is exposed to light does it operate to serve to close the circuit. This constitutes a second switch arrangement. The user-operated switch member 24 constitutes a third switch arrangement and it will be noted that only when all three switch arrangements are closed will the LED's be illuminated.

There will now be explained a method of use of the above-described device in a typical working environment, in which adhesive labels incorporating a light source are attached to drinks bottles. The bottles are then packed and, just before or during the packing step, the pull tabs 26 are removed, thus closing the first switch arrangement.

The packing step involves placing a plurality of bottles in a box such that, when the box is sealed, the bottles are in complete darkness. Thus light sensors 18 do not receive any light. When the bottles are unpacked, light falls on the light sensors, thus closing the second switch arrangement.

Until this stage, any inadvertent closure of the switch 24 has no effect because the other switch arrangements are open. From now on, though, actuation of switch 24 to close it results in the illumination of LED's 14 and the contents of the bottle. This is the closure of the third switch arrangement.

An advantage of the above described device is that unwanted discharge of battery 22 is prevented before its period of intended use.

The SMD LEDs 14 used are compact and, being rectangular, pack well among themselves and other surface components thus permitting high component densities. The above-mentioned disadvantages of the subsequent covering with resin are also avoided.

Although SMD LEDs can be applied by hand, it is expedient if they are applied solely by machine, so that the process can be automated. When applied by machine, the solder used is minimised and neat and contained within a well defined area. This enables the process to be quick and to be cost effective for high volume production.

SMD LEDs also provide greater consistency from one LED to the next in terms of colour and light output. For example bonded white LEDs are produced by hand-doping blue LEDs with a phosphor. Doping by hand is subject to wide tolerances and often leads to inconsistencies in colour and light output.

A further advantage of using SMD LEDs is that the angle of light dispersion can be carefully controlled to maximise the contents illumination opportunities. Thus they provide improved options for consistency and range of choice.

By introducing a light sensor into the device and configuring the circuit so that it turns the device off when in total or virtual darkness the problem of accidental discharge is overcome. The device can be manually actuated at the bottling/packing facility by the removal of the pull-tab. When the bottle/container is placed into its packaging box for transportation and storage, as soon as the lid of the packaging box is sealed, the light sensor detects very low levels of light and automatically switches off the device. During the transportation and warehousing stages when the bottle/container is in its sealed (and therefore dark) packaging box, the device remains in an off state. The light sensor allows the device to be automatically switched on again when the bottle/container is removed from the packaging box into a brighter environment i.e. when the bottle/container is ready to be used and/or placed on a supermarket shelf. At this stage, switch 24 takes over as the main actuation member of the device.

Instead of being a user-operated switch, switch 24 may be replaced by a switch responsive to an external factor such as movement, vibration, music or other sound, temperature, moisture on the expiry of a period of time. In particular the switch can be triggered by the use of different sensors, with or without an interface circuit to such a trigger input. Such sensors may include motion sensors such as inertial switches, vibration sensors such as passive piezoelectric sensors, temperature sensors such as PTCs, NTCs or IR sensors, magnetic sensors such as Hall-effect devices, RF sensors such as radio frequency receivers, electromagnetic sensors such as LDRs or photo-diodes, light sensors, sound sensors such as electret condenser microphones, moisture sensors, proximity sensors, pressure sensors, manual switching, direct circuit interfacing, etc. In particular, the sensor may be part of a sound-actuated device as disclosed in co-pending patent application (GB 0921747.2) entitled "Sound Actuated Illumination Device". The illumination effect can be made time variable so the effect lasts for and/or starts after a specified period of time. It is possible to implement more than one type of sensor simultaneously.

Typically, drinks bottles are transported in boxes that contain multiple bottles. It may therefore not be desirable for all of the bottles to have their light sensors turn the devices back on again when the box is unsealed, because there may be a period of time before all of the bottles in the box are needed. If all the light sensors fitted to devices in the same box were turned on at the same time, it is conceivable unwanted triggering could occur e.g. in a bar music could start triggering audio sensors on bottles that were still in the storage box waiting to be used. Similarly, vibration sensing devices could be falsely triggering whilst still in an open box. Therefore it may be advantageous to modify the storage boxes in which the bottles or containers are transported such that when the sealed box is opened, all of the bottles or containers are not simultaneously subjected to increased light levels. Such a modification could take various forms. Typically a box containing a spirits bottle is subdivided by cardboard inserts to create individual compartments for the bottles so that they are protected from each other during transit. A layer of black or other dark coloured tissue paper can be placed over the top of the box opening, such that when the box is unsealed the paper layer continues to keep the bottles in darkness. To remove a bottle from its individual compartment in the box, a hole can easily be punched by hand through the tissue paper. Light only passes into the individual compartment from which the bottle was being removed, thereby keeping light from the other compartments and keeping those light sensors in an off state. Alternatively, a cardboard sleeve can be placed over the neck of the bottles in their individual compartments such that the light is blocked from reaching the base of the bottle where the light sensor is housed.

Figure 3:
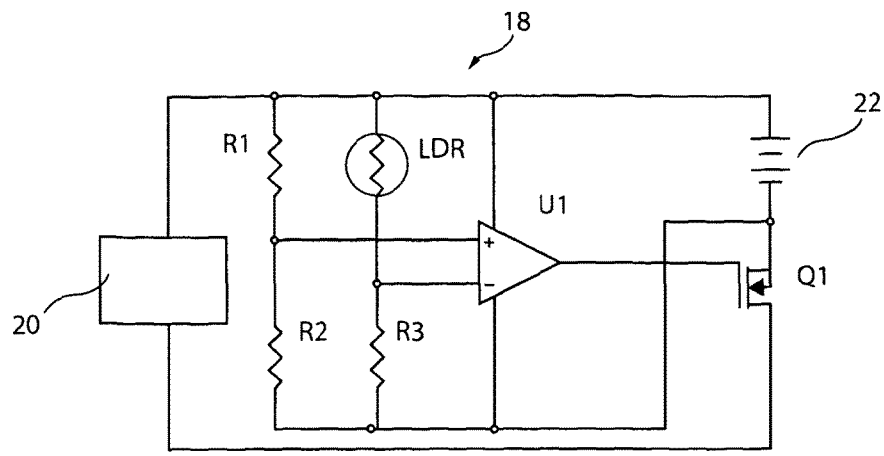
FIG. 3 is a circuit diagram of a switch circuit for use in embodiments of the present invention.

Light sensing requires constant monitoring of light levels. This may be achieved by using a light sensor 18 coupled into a very low power comparator with a preset threshold, as shown in FIG. 3. Current consumptions as low as one micro-amp or less are obtainable, thus ensuring the longevity of small cells for long periods of time. In FIG. 3, U1 is a low power comparator. R1, 2 &3 are fixed value resistors and Q1 is an n-channel mosfet.

The LDR is a light dependent resistor. A current is provided through R1 & 2, the LDR & R3 and the comparator from the battery or cells 22. R1 & 2 form a potential divider and provide at their common junction a voltage which is in proportion to the supplied voltage. Similarly the LDR and R3 provide a proportioned voltage. These two voltages will track each other with changing supply voltages. They are compared and the output of the comparator is either high or low depending on the state of the LDR only. R2 & R3 may be chosen to be of the same value thereby allowing R1 to be selected to match the LDR response. They are also chosen depending on how much current is required or allowed through these two resistive paths. In this circuit, the comparator shown is taken as having a push-pull output stage. When the comparator output is low, then the gate-source voltage for the n-channel mosfet is equal to or very close to zero. In this state the mosfet is off and only allows a negligible leakage current to flow from drain to source. Therefore the main circuit 20 is not supplied with sufficient current to operate. When the comparator output is high, the gate-source voltage exceeds the selected gate threshold and therefore allows sufficient current to flow to the main circuit.

In this fashion the main circuit may be actuated or switched off with respect to a level of light incident on the LDR. Inverted versions of this arrangement are possible.

There are other methods for ensuring the device is not actuated during transit. Instead of removing a pull-tab 26 prior to transit, a modified pull-tab can remain in the device so the device is in an off state. The modification of the pull-tab takes the form of an increase in its length such that it is able to have its free end attached to the box in which it is being transported. Upon arrival at its destination and removal of the bottle/container from the storage box, the act of pulling the bottle up and out of the box creates a force which automatically completely removes the pull-tab. It will be seen that this modification has only two switches, since it effectively combines the first and second switching arrangements into a single switch arrangement.

The various switch arrangements may take different forms. For example the pull-tab switch used at or before the packing stage could be replaced by any type of manually-operated switch, e.g. a toggle switch or a push-button switch. Alternatively the step which constitutes closing the first switch arrangement could be the insertion of battery 22 to complete the connection between its contacts.

In another modification at the pre-packaging stage, an opaque strip of material can be applied over light sensor 18 to prevent it actuating its associated switch. The strip is removed before the packing step is completed. In this modification, the pull-tab switch is not required.

Figure 4:
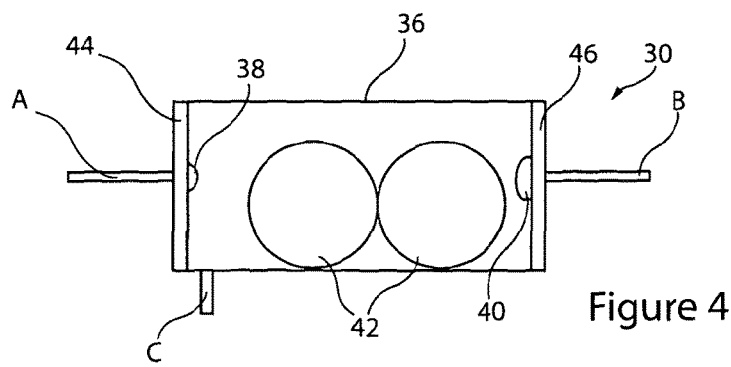
FIG. 4 is a side view of a tilt switch for use in embodiments of the present invention.

FIG. 4 shows a tilt switch 30 which can be used as switch 24. Tilt switch 30 is a double-ended switch coupling a generally cylindrical, conductive casing 36 having contacts 38, 40 respectively connected to terminal wires A and B. The end contacts are respectively mounted within insulating ends 44, 46. The casing end has a terminal wire at C. The casing contains two conductive balls 42 which, when the switch is tilted towards one end, electrically connect the respective contact 38, 40 to the casing. The switch is used with its end terminal wires A and B electrically connected together. Thus in FIG. 2, terminal contact C can constitute terminal 32 and wires A and B together constitute terminal 34. Thus the light source is illuminated when the switch is tilted towards either end.

In a modification, terminal wires A and B are not interconnected and only one of them acts as terminal 34. In this case, the light source is only illuminated when the switch is tilted towards one of its ends.

In another modification, terminal wires A and B may be connected to different parts of a modified circuit 20 (not shown) so that closing the switch at one end produces a first illumination effect and closing the switch at the opposite end produces a second illumination effect.

In modifications, the tilt switch 30 (or any of the devices used as switch 24) is connected to circuit 20 via a trigger circuit so that it is only the initial engagement of a ball 42 with an end contact which has an effect, and the subsequent maintaining of the engagement has no further effect. A preferred trigger circuit is shown and described in FIG. 1 of co-pending application 0921749.8 entitled "Improvements in Illumination Devices".

Tilt switch 30 may comprise only a single conductive ball 42 and a single-ended tilt switch can be used instead of tilt switch 30.

Figure 5:
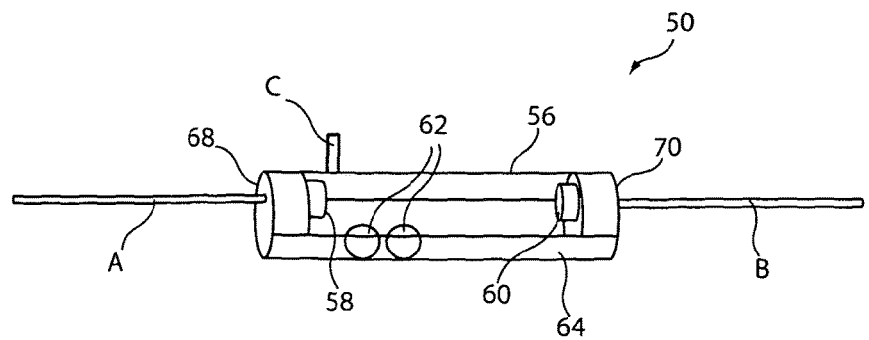
FIG. 5 is a perspective view of another tilt switch for use in embodiments of the present invention.

FIG. 5 shows an alternative tilt switch 50 which can be used as switch 24 instead of tilt switch 30. The switch comprises a generally cylindrical conductive casing 56 with end contacts 58, 60 respectively connected to terminal wires A and B. The end contacts are respectively mounted within insulating ends 68, 70. The casing has a terminal contact C. Terminals A, B and C are connected into the circuit of FIG. 2 in the same way as the terminals of switch 30. Casing 56 contains two conductive balls 62. In addition, casing 56 has on its inner surface an insulating layer or strip 64 which extends from end to end and around half of the circumference of the casing (the bottom half as shown in FIG. 5). Thus whatever the positions of the balls 62 along the length of switch 50, they are unable to complete any circuit while they are rolling on insulating strip 64.

To further ensure that undesired contact between balls 62 and conductive casing 56 is prevented, it is arranged that end contacts 58, 60 are radially offset away from insulating strip 64 and that balls 62 are of a size such that they do not touch contacts 58, 60 while rolling on the insulating strip.

Tilt switch 50 is particularly useful when the article to which the light source is attached can be disposed upside down when the light effect is not required. This ensures that, with the insulating strip 64 at the bottom, the battery is not drained even when the switch is tilted from side to side or subjected to vibrations. When the light effect is required, switch 50 is inverted so that strip 64 is at the top, and the switch behaves like a normal tilt switch.

In a modification of FIG. 5, the end contacts 58, 60 are not radially offset, the insulating strip 64 alone being relied on to provide the required function.

In an alternative modification of FIG. 5, the insulating strip 64 is omitted, the offset position of the end contacts 58, 60 combined with the small diameter of balls 62 being relied on to provide the required function.

In modification, a tilt switch 30 or 50 can be used as the second switch, i.e. instead of light sensor 18.

It is possible to use first and second tilt switches 30, oriented in two mutually perpendicular directions, as the second and third switches 18, 24 respectively. The first tilt switch replacing the light sensor 18 is a single-ended tilt switch arranged substantially vertically so as always to be switched off when the article is being transported or stored upside-down. The second tilt switch replacing switch 24 is arranged substantially horizontally and functions as described previously.

In a further modification, it is possible to use a single tilt switch 50 to act as both the second and third switches 18 and 24. In other words, light sensor 18 is omitted, and it is arranged that both during transport and during storage before use, the tilt switch 50 is disposed with the insulating strip 64 at the bottom. This can be arranged by the configuration of the packaging of the relevant article. An advantage of this modification is that only two switch components are required, viz the first switch 26 and the tilt switch 50.

As an alternative to bottles for drinks, the above-described illumination devices may be attached to a wide range of articles, such as cigarette packets, ash trays, cornflake packets, and containers for toothpaste, cosmetics, foodstuffs etc.

The features of the various arrangements and modifications described may be combined or substituted for each other as desired.

The features of the present disclosure may be substituted for or combined with, as appropriate, the features of co-pending international patent applications WO 2011/070336 entitled "Sound-actuated Illumination Circuit" and WO 2011/070338 entitled "Switch Actuated Circuits", both filed on even date.

The invention claimed is:

1. An article configured to be packed in packaging material, the article comprising at least one light or sound source, and an electrical circuit for actuating the source, the electrical circuit including at least one battery and at least a first, second and third switch, which are actuated independently of each other, which are constituted by different types of switches, and all of which must be closed for the source to be actuated, the article and the packaging being configured such that, with the article packed in the packaging, the first switch is open, and, with the packaging removed from the article, the first switch is closed.

2. An article according to claim 1, wherein the second switch is configured to make an electrical connection between a battery terminal and an adjacent circuit conductor.

3. An article according to claim 2, wherein the second switch comprises a pull-tab.

4. An article according to claim 1, wherein the first switch comprises a light sensing device.

5. An article according to claim 1, wherein the third switch is selected from the group comprising:
   a user-operated switch;
   a switch responsive to an external factor;
   a tilt switch; and
   a time switch.

6. An article according to claim 2, wherein the first switch and the third switch are constituted by a tilt switch arrangement.

7. An article according to claim 6, wherein the third switch arrangement is constituted by a first tilt switch, and the third switch is constituted by a second tilt switch disposed at a suitable orientation relative to the first tilt switch.

8. An article according to claim 1, wherein at least one surface mount LED is used as a light source.

9. The article according to claim 5, wherein the external factor comprises at least one of a movement, a vibration, a sound, a temperature, a moisture, or an expiration of time.

10. A method of actuating at least one light or sound source attached to an article, wherein a drive circuit for the source comprises at least first, second, and third switches, which are actuated independently of each other and in different ways and all of which have to be closed for the source to be activated, the method comprising automatically closing the first switch when unpacking the article, and closing the third switch at a stage subsequent to closing the first switch.

11. A method according to claim 10, the method comprising closing the second switch at a stage subsequent to closing the first switch.

12. A method according to claim 10, wherein the first switch comprises a light sensor which causes a respective switch closing operation when exposed to light, and wherein a plurality of articles are packed in a light-tight package, the arrangement being such that either:
   all of the articles are unpacked simultaneously, whereby all their light sensors are exposed to light and their respective switches are closed; or
   the articles are unpacked separately, whereby only each unpacked article has its light sensor exposed to light and has its respective switch closed.

13. A method according to claim 12, wherein the third switch is arranged to be activated by:
   a user;
   exposure to an external factor;
   tilting; and/or
   the elapse of a period of time.

14. A method according to claim 13, wherein the article is a light-transmitting container and a surface mount LED is used as a light source to illuminate the contents of the container.

15. A method of actuating a plurality of light or sound sources attached to respective articles, wherein a drive circuit for each source comprises at least a first switch, a second switch, and a third switch, the first switch, the second switch, and the third switch being different types of switches from one another and being activated in different ways and independently of each other and all of which have to be closed for the source to be activated, the method comprising automatically closing the first switch when packing the article, automatically closing the second switch when unpacking the article, and closing the third switch at a stage subsequent to closing the first and second switches, wherein the second switch comprises a light sensor which causes a respective switch closing operation when exposed to light, and wherein the plurality of articles are packed in a light-tight package, the method being such that either:

all of the articles are unpacked simultaneously, whereby all their light sensors are exposed to light and their respective second switches are closed; or the articles are packed separately, whereby only each unpacked article has its light sensor exposed to light and has its respective second switch closed.

16. An article configured to be packed in a removable packaging material, the article comprising:

at least one light source or sound source; and an electrical circuit for actuating the source, the electrical circuit including at least one battery and at least a first switch, a second switch, and a third switch, the first switch, the second switch, and the third switch being different types of switches from one another and being actuated independently of each other, the source being actuated when the first switch, the second switch, and the third switch are all independently closed, and the first switch comprising a light sensing device configured such that, the first switch is open when the article is packed in the packaging material, and the first switch is closed when the article is removed from the packaging material.

* * * * *